United States Patent
Wada et al.

(10) Patent No.: US 12,420,589 B2
(45) Date of Patent: Sep. 23, 2025

(54) RADIAL TIRE FOR AIRCRAFT

(71) Applicant: BRIDGESTONE CORPORATION, Tokyo (JP)

(72) Inventors: Shogo Wada, Tokyo (JP); Takuya Matsumoto, Tokyo (JP); Kazutaka Jinno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/563,006

(22) PCT Filed: Nov. 17, 2021

(86) PCT No.: PCT/JP2021/042333
§ 371 (c)(1),
(2) Date: Nov. 21, 2023

(87) PCT Pub. No.: WO2022/264449
PCT Pub. Date: Dec. 22, 2022

(65) Prior Publication Data
US 2024/0270020 A1    Aug. 15, 2024

(30) Foreign Application Priority Data
Jun. 15, 2021 (JP) ................. 2021-099726

(51) Int. Cl.
  *B60C 15/06* (2006.01)
  *B60C 3/04* (2006.01)

(52) U.S. Cl.
  CPC ............ *B60C 3/04* (2013.01); *B60C 15/06* (2013.01); *B60C 15/0603* (2013.01);
  (Continued)

(58) Field of Classification Search
  CPC ....... B60C 3/04; B60C 15/06; B60C 15/0603; B60C 2015/0614; B60C 2015/0621; B60C 15/0607
  See application file for complete search history.

(56) References Cited

U.S. PATENT DOCUMENTS 5,033,524 A * 7/1991 Ohtsuka .................. B60C 15/06
                                                            152/542
5,476,129 A   12/1995 Shoyama
(Continued)

FOREIGN PATENT DOCUMENTS

EP    3539795 A1   9/2019
FR    2187559 A1   1/1974
(Continued)

OTHER PUBLICATIONS

English machine translation of JP S61-241203 (Year: 1986).*
(Continued)

*Primary Examiner* — Robert C Dye
(74) *Attorney, Agent, or Firm* — KENJA IP LAW PC

(57) ABSTRACT

In a radial tire for aircraft according to this disclosure, in a tire widthwise cross-sectional view, in a reference state assembled onto an applicable rim, charged with a prescribed internal pressure, and unloaded, a rim width RW of the applicable rim and a tire maximum width W satisfy RW/W≤0.7, and in the tire widthwise cross-sectional view, in the reference state, a tread width TW and the tire maximum width W satisfy 0.73<TW/W<0.8.

13 Claims, 4 Drawing Sheets

(52) U.S. Cl.
CPC ............... *B60C 2015/0614* (2013.01); *B60C 2015/0621* (2013.01); *B60C 2200/02* (2013.01)

(56) References Cited

U.S. PATENT DOCUMENTS

| | | | |
|---|---|---|---|
| 8,376,011 | B2 | 2/2013 | Ueyoko et al. |
| 9,272,577 | B2 | 3/2016 | Ueyoko |
| 2010/0147434 | A1* | 6/2010 | Ueyoko ............... B60C 15/024 152/534 |
| 2012/0160392 | A1* | 6/2012 | Van Riper ............ B29B 7/603 152/543 |
| 2012/0312442 | A1 | 12/2012 | Ueyoko |
| 2013/0056126 | A1 | 3/2013 | Ueyoko et al. |
| 2016/0159156 | A1 | 6/2016 | Knavish et al. |
| 2016/0167450 | A1* | 6/2016 | Ueyoko ............... B60C 9/04 152/539 |
| 2016/0167453 | A1* | 6/2016 | Ueyoko ............... B60C 15/06 152/539 |
| 2016/0200147 | A1 | 7/2016 | Ueyoko |
| 2016/0207356 | A1 | 7/2016 | Ueyoko |
| 2016/0263944 | A1 | 9/2016 | Ueyoko |

FOREIGN PATENT DOCUMENTS

| | | | |
|---|---|---|---|
| JP | S61241203 | A | 10/1986 |
| JP | H0316812 | A | 1/1991 |
| JP | H03200402 | A | 9/1991 |
| JP | H07172118 | A | 7/1995 |
| JP | 08156533 | A * | 6/1996 |
| JP | H1076822 | A | 3/1998 |
| JP | 2005271863 | A | 10/2005 |
| JP | 2008273247 | A | 11/2008 |
| JP | 2010120476 | A | 6/2010 |
| JP | 2010137854 | A | 6/2010 |
| JP | 2013001390 | A | 1/2013 |
| JP | 2013001392 | A | 1/2013 |
| JP | 2013056659 | A | 3/2013 |
| JP | 2016107981 | A | 6/2016 |

OTHER PUBLICATIONS

English machine translation of JP H03-016812 (Year: 1991).*
English machine translation of JP 2008-273247 (Year: 2008).*
English machine translation of JP-08156533-A. (Year: 1996).*
Sep. 11, 2024, search result of the Extended European Search Report issued by the European Patent Office in the corresponding European Patent Application No. 21946120.9.
Jan. 11, 2022, International Search Report issued in the International Patent Application No. PCT/JP2021/042333.
Dec. 14, 2023, International Preliminary Report on Patentability issued in the International Patent Application No. PCT/JP2021/042333.

* cited by examiner

RADIAL TIRE FOR AIRCRAFT

TECHNICAL FIELD

This disclosure relates to a radial tire for aircraft.

BACKGROUND

A technique to improve the durability of a radial tire for aircraft (hereinafter, also referred to simply as the "tire") is known. For example, PTL 1 discloses that the durability of a radial tire for aircraft is improved by setting a ratio B/BW of a rim width B of the wheel to a belt width BW of the tire to the range from 0.84 to about 1.

CITATION LIST

Patent Literature

PTL 1: JP2013001390A

SUMMARY

Technical Problem

Generally, in order to repeatedly use the radial tire for aircraft by performing retread, the durability of the tire is still required to be further improved. In particular, the radial tire for aircraft has large load and extremely high prescribed internal pressure. Thus, the damage at a bead portion is likely to occur, and the durability of the bead portion is required to be further improved.

In consideration of the above condition, it could be helpful to provide a radial tire for aircraft having improved durability.

Solution to Problem

In a radial tire for aircraft according to this disclosure, in a tire widthwise cross-sectional view, in a reference state assembled onto an applicable rim, charged with a prescribed internal pressure, and unloaded, a rim width RW of the applicable rim and a tire maximum width W satisfy $RW/W \leq 0.7$, and in the tire widthwise cross-sectional view, in the reference state, a tread width TW and the tire maximum width W satisfy $0.73 < TW/W < 0.8$.

Advantageous Effect

This disclosure can provide a radial tire for aircraft having improved durability.

DETAILED DESCRIPTION

Figure 1:
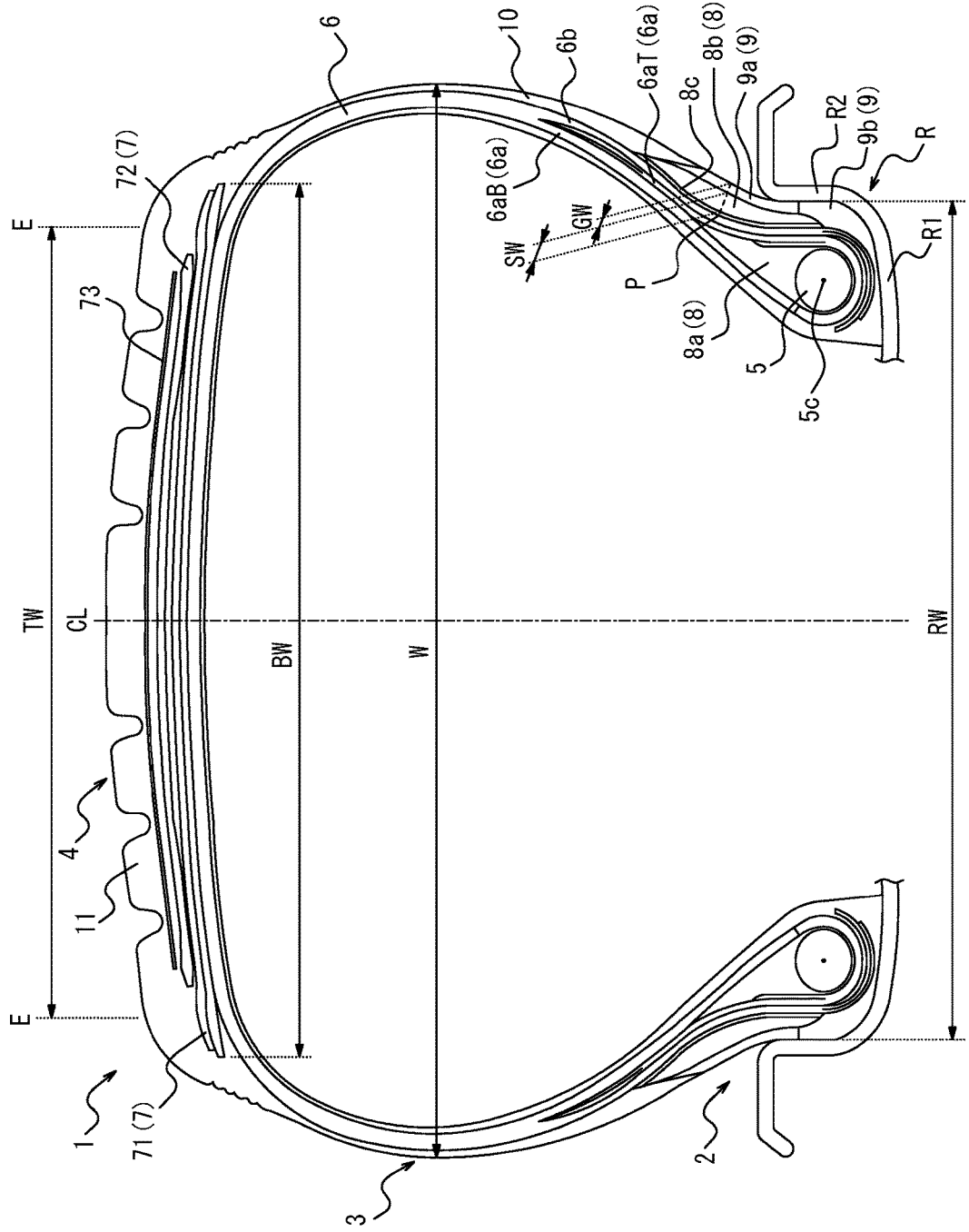
FIG. 1 is a tire width direction cross-sectional view of a radial tire for aircraft according to one of the disclosed embodiment.

A radial tire for aircraft according to one of the disclosed embodiment will be described below with reference to the drawings. Members and portions common between the drawings have the same reference numerals.

FIG. 1 is a tire width direction cross-sectional view when a radial tire for aircraft 1 (hereinafter, also referred to simply as the "tire 1") according to one of the embodiments is cut along a tire width direction. As illustrated in FIG. 1, the tire 1 includes a pair of bead portions 2, a pair of sidewall portions 3 extending to the outer sides in a tire radial direction of these bead portions 2, and a tread portion 4 extending between these sidewall portions 3. In FIG. 1, the tire 1 is illustrated in a reference state where the tire 1 is assembled onto a rim R of a wheel, an applicable rim, charged with a prescribed internal pressure, and unloaded. Specifically, the bead portions 2 in the tire 1 are seated on a bead sheet R1 of the rim R and supported from side surfaces by rim flanges R2. The following describes assuming that a lumen of the tire 1 is charged with air and the tire 1 is mounted on a vehicle such as an aircraft.

In the present description, the "tire width direction" refers to a direction parallel to a rotation axis of the tire 1. The "tire radial direction" refers to a direction orthogonal to the rotation axis of the tire 1. The "tire circumferential direction" refers to a direction in which the tire rotates around the rotation axis of the tire 1.

In the present description, a side closer to the rotation axis of the tire 1 along the tire radial direction is referred to as an "inner side in the tire radial direction", and a side farther from the rotation axis of the tire 1 along the tire radial direction is referred to as an "outer side in the tire radial direction". On the other hand, a side closer to a tire equatorial plane CL along the tire width direction is referred to as an "inner side in the tire width direction", and a side farther from the tire equatorial plane CL along the tire width direction is referred to as an "outer side in the tire width direction".

In the present description, it is considered that the positional relationship and the like of respective components of the tire 1 are measured in the reference state, unless otherwise noted. The "reference state" is a state where the tire 1 is assembled onto the rim R of the wheel, the applicable rim, charged with the prescribed internal pressure, and unloaded. Both ends in the tire width direction of a contact patch in contact with the road surface, in a state where the tire is mounted on a rim of the wheel, an applicable rim and the tire is charged with the prescribed internal pressure and loaded with the prescribed load, are referred to as ground contact edges E.

In the present description, the "applicable rim" refers to an approved rim (Design Rim) in an applicable size that is described in the latest edition of AYB (AIRCRAFT YEAR BOOK) or the latest edition of EDI (Engineering Design Information for Aircraft Tires) (the 2017 edition is used for numerical descriptions in the present description) issued by TRA (The Tire and Rim Association, Inc.) in the United States, or will be described in AYB or EDI in the future. In cases of sizes not described in the above standards, the "applicable rim" refers to a rim applicable to the tire 1.

In the present description, the "prescribed internal pressure" refers to an air pressure (maximum air pressure) corresponding to the maximum load capability for a single wheel in the applicable size and ply rating described in the above standards. In cases of sizes not described in the above standards, the "prescribed internal pressure" refers to an air pressure (maximum air pressure) corresponding to the maximum load capability prescribed for each vehicle on which the tire 1 is mounted. Furthermore, in the present description, the "prescribed load" refers to a load corresponding to the maximum load capability for a single wheel in the applicable size and ply rating described in the above standards. In cases of sizes not described in the above standards, the "prescribed load" refers to a load corresponding to the maximum load capability prescribed for each vehicle on which the tire 1 is mounted.

In the radial tire for aircraft 1 according to this embodiment, in the tire widthwise cross-sectional view in the reference state where the tire 1 is assembled onto the rim R of the wheel, the applicable rim, charged with the prescribed internal pressure, and unloaded, a rim width RW of the rim R and a tire maximum width W satisfy RW/W≤0.7.

The tire 1 includes: a pair of bead cores 5 disposed on the bead portions 2; a carcass 6, which is composed of one or more plies, toroidally extending between the pair of bead cores 5; and a belt 7, which is composed of one or more belt layers, disposed on the outer side in the tire radial direction of the crown portion of the carcass 6.

The tire 1 further includes a stiffener rubber 8 and a rubber chafer 9 on the bead portion 2, includes a side rubber 10 disposed on the outer side in the tire width direction of the carcass 6 on the sidewall portion 3, and includes a tread rubber 11 disposed on the outer side in the tire radial direction of the belt 7 on the tread portion 4.

In this embodiment, the tire 1 is described as having a symmetrical configuration with respect to the tire equatorial plane CL. However, the tire 1 may have an asymmetric configuration with respect to the tire equatorial plane CL.

In this embodiment, the bead core 5 is composed of an annular cable bead extending in the tire circumferential direction. The cross-sectional shape of a surface orthogonal to the extending direction of the bead core 5 (cross-sectional shape in the tire width direction) is circular or roughly circular. The cable bead is configured, for example, such that a high-carbon steel wire is coated with rubber.

The carcass 6 is composed of one or more (in this embodiment, five) plies toroidally extending between the pair of bead cores 5. The carcass 6 includes one or more (in this embodiment, three) turn-up plies 6a and one or more (in this embodiment, two) down plies 6b. The turn-up plies 6a and the down plies 6b are configured, for example, such that organic fiber cords such as nylon cords are coated with rubber. However, the carcass 6 may be configured not to have the turn-up plies 6a or the down plies 6b.

The turn-up plies 6a each have a ply main body 6aB toroidally extending between the bead cores 5 and ply windup portions 6aT wound up from the inner side in the tire width direction to the outer side around the bead cores 5. In this embodiment, respective end portions of the ply windup portions 6aT of the turn-up plies 6a are arranged at positions different from one another in the tire radial direction. Specifically, two of the ply windup portions 6aT of the three turn-up plies 6a terminate at the inner side in the tire radial direction with respect to the position of the tire maximum width W in the reference state. The remaining one of the ply windup portions 6aT of the three turn-up plies 6a terminates at the outer side in the tire width direction of a first stiffener rubber 8a, which is described below. However, the ply windup portions 6aT of the turn-up plies 6a may be configured to be wound around the bead core 5.

The down plies 6b cover the ply windup portions 6aT of the turn-up plies 6a from the outer side in the tire width direction and extend to the inner side in the tire radial direction of the bead core 5. In this embodiment, the down plies 6b extend to and terminate at the inner side in the tire width direction with respect to a center 5c of the bead core 5. Respective end portions of the down plies 6b are arranged at positions different from one another in the tire radial direction and the tire width direction.

The stiffener rubber 8 is disposed on the outer side in the tire radial direction of the bead core 5. In this embodiment, the stiffener rubber 8 includes the first stiffener rubber 8a, a second stiffener rubber 8b, and a sheet rubber 8c.

The first stiffener rubber 8a is disposed in a region surrounded by the ply main body 6aB and the ply windup portion 6aT of the turn-up ply 6a and the bead core 5, on the outer side in the tire radial direction of the bead core 5. In this embodiment, the first stiffener rubber 8a has a substantially triangular shape in which the width in the tire width direction is tapered from the inner side toward the outer side in the tire radial direction, in the tire widthwise cross-sectional view.

The second stiffener rubber 8b is disposed on the outer side in the tire width direction of the carcass 6. In this embodiment, the second stiffener rubber 8b extends in the tire radial direction, from the end portion located in the vicinity of the outer side in the tire width direction of the center 5c of the bead core 5, over the outer end in the tire radial direction of the first stiffener rubber 8a, to the end portion located at the inner side in the tire radial direction with respect to the outer end in the tire radial direction of the ply windup portion 6aT of the turn-up ply 6a. In this embodiment, the second stiffener rubber 8b has a shape in which the width in the tire width direction is tapered from near the center toward the end portion in the tire radial direction of the second stiffener rubber 8b, in the tire widthwise cross-sectional view. In this embodiment, the first stiffener rubber 8a and the second stiffener rubber 8b are formed of rubber materials different from one another but may be formed of an identical rubber material.

The second stiffener rubber 8b is disposed to cover at least one point on the outer edge in the tire width direction of the carcass 6, indicated by a position P in FIG. 1, from the outer side in the tire width direction.

Figure 2:
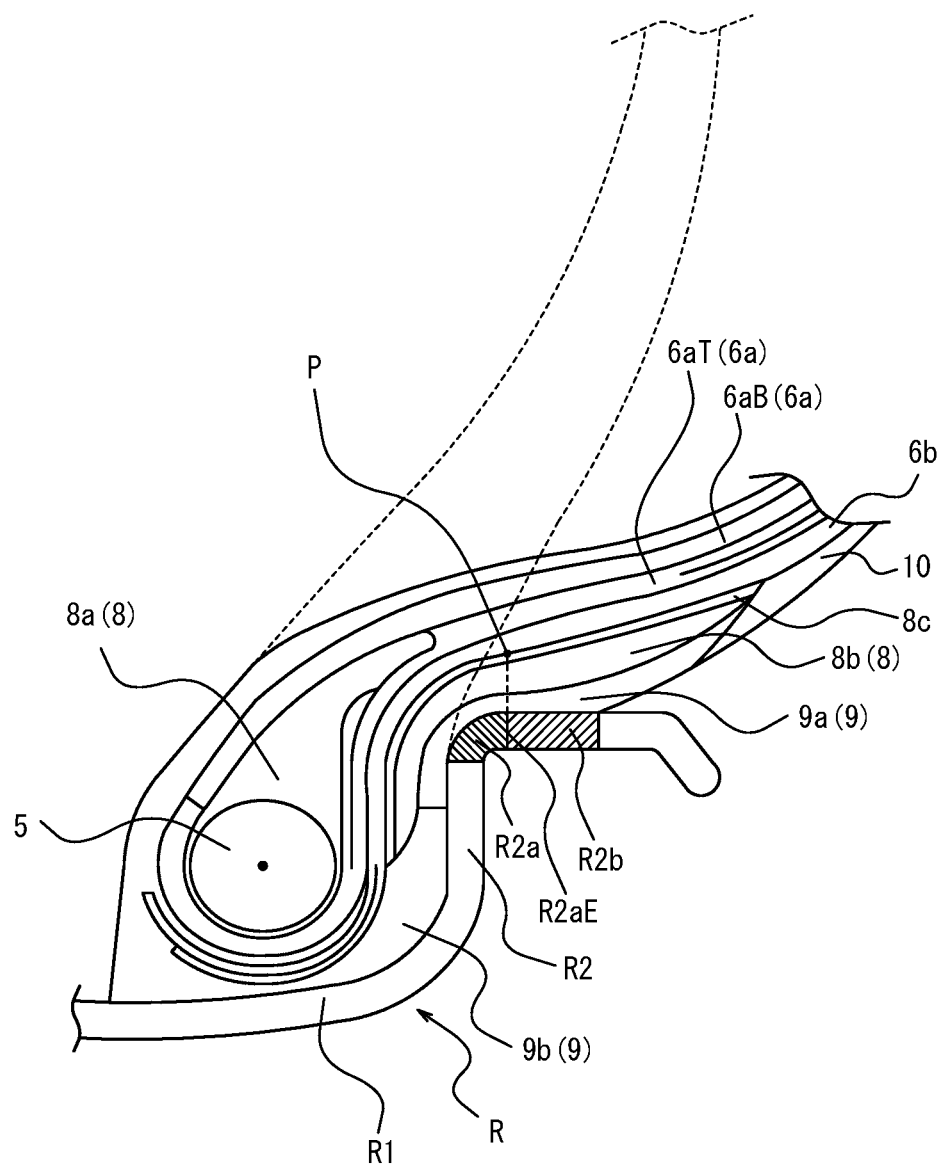
FIG. 2 is a tire width direction cross-sectional view of a bead portion of the radial tire for aircraft illustrated in FIG. 1.

The position P is described with reference to FIG. 2. FIG. 2 is a tire width direction cross-sectional view of the bead portion 2 in the radial tire for aircraft 1. In FIG. 2, the tire 1 in a state where the tire 1 is assembled onto the rim R of the wheel, the applicable rim, charged with the prescribed internal pressure, and loaded with the prescribed load is indicated by a solid line, while the tire 1 in the reference state is indicated by a dashed line. As illustrated in FIG. 2, the rim flange R2 rises up from the outer end in the tire width direction of the bead sheet R1 and has a curved portion R2a that is convex to the outer side in the tire radial direction and a horizontal portion R2b extending from this curved portion R2a to the outer side in the tire width direction.

The position P is a position where a virtual line extending from an outer end R2aE in the tire width direction of the curved portion R2a of the rim flange R2 of the rim R to the outer side in the tire radial direction intersects with the outer edge in the tire width direction of the carcass 6, in the tire widthwise cross-sectional view, in a state where the radial tire for aircraft 1 is assembled onto the rim R of the wheel, the applicable rim, charged with the prescribed internal pressure, and loaded with the prescribed load. The outer end R2aE in the tire width direction of the curved portion R2a of the rim flange R2 can be specified as a boundary between the curved portion R2a and the horizontal portion R2b on the surface facing the tire 1 of the rim flange R2.

The stress concentrates on the position P in a state where the tire 1 is assembled onto the rim R. Thus, in the present description, this position P is also referred to as a stress concentration position P of the carcass 6. The carcass 6 is likely to have larger deformation and higher temperature in the vicinity of the stress concentration position P when the load of the aircraft is applied to the carcass 6 during takeoff and landing and taxiing of the aircraft. Therefore, fractures are likely to occur combined with large deformation and high temperature in the vicinity of the stress concentration position P of the carcass 6. Covering the vicinity of the stress concentration position P of the carcass 6 with the second stiffener rubber 8b can decrease the stress applied to the carcass 6. This causes fractures to be less likely to occur on the carcass 6 to improve the durability of the bead portion 2.

Furthermore, the second stiffener rubber 8b is formed of a rubber material having low heat generating property with a loss coefficient tan δ lower than that of a first rubber chafer 9a, which is described below, disposed on the outer side in the tire width direction of the second stiffener rubber 8b, in the reference state. Disposing the second stiffener rubber 8b with a lower loss coefficient tan δ in the vicinity of the stress concentration position P of the carcass 6 can decrease the temperature in the vicinity of the carcass 6. This causes fractures to be less likely to occur on the carcass 6 to improve the durability of the bead portion 2. Each loss coefficient tan δ of the second stiffener rubber 8b and the first rubber chafer 9a is measured using a spectrometer, for example, under conditions at room temperature, at 52 Hz, and with an amplitude distortion of 2%.

With reference to FIG. 1 again, the sheet rubber 8c covers at least a part of the surface on the inner side in the tire width direction of the second stiffener rubber 8b. That is, the second stiffener rubber 8b and the sheet rubber 8c are located as the stiffener rubber 8 on the outer side in the tire width direction of the carcass 6. In the illustrated example, the sheet rubber 8c covers the whole surface on the inner side in the tire width direction of the second stiffener rubber 8b. However, the sheet rubber 8c may be configured to cover a part of the surface on the inner side in the tire width direction of the second stiffener rubber 8b. In this embodiment, the sheet rubber 8c is formed of a rubber material with a rigidity larger than that of the second stiffener rubber 8b and smaller than that of the carcass 6. This can cause the sheet rubber 8c to decrease a difference in the level of rigidity between the second stiffener rubber 8b and the carcass 6 to mitigate the strain of the second stiffener rubber 8b in a state where the tire 1 is assembled onto the rim R, in particular, a state where the tire 1 is charged with the internal pressure or a state where the tire 1 is loaded with the load. However, the stiffener rubber 8 disposed on the outer side in the tire width direction of the carcass 6 does not have to include the sheet rubber 8c.

The rubber chafer 9 is disposed to cover the carcass 6 and the stiffener rubber 8 from the inner side in the tire radial direction and the outer side in the tire width direction. In this embodiment, the rubber chafer 9 includes the first rubber chafer 9a and a second rubber chafer 9b. The first rubber chafer 9a is disposed on the outer side in the tire width direction of the second stiffener rubber 8b.

The first rubber chafer 9a covers at least a part (in this embodiment, a great part) of the second stiffener rubber 8b from the outer side in the tire width direction and is sandwiched between the side rubber 10 and the second rubber chafer 9b in the tire radial direction. In this embodiment, the first rubber chafer forms the outer surface of the tire 1. The first rubber chafer 9a is mainly in contact with the rim flange R2 of the rim R in the reference state. The first rubber chafer 9a is disposed to cover the outer side in the tire width direction of the second stiffener rubber 8b, at least, at the outer side in the tire width direction of the stress concentration position P of the carcass 6. Covering the second stiffener rubber 8b and the vicinity of the stress concentration position P of the carcass 6 with the first rubber chafer 9a can decrease the stress applied to the carcass 6.

The second rubber chafer 9b is located on the inner side in the tire radial direction of the first rubber chafer 9a. Specifically, the second rubber chafer 9b is disposed to be in contact with the first rubber chafer 9a from the inner side in the tire radial direction at the outer side in the tire width direction of the bead core 5 and cover the bead core 5 and the carcass 6 from the inner side in the tire radial direction. The second rubber chafer 9b is mainly in contact with the bead sheet R1 of the rim R in a state where the tire 1 is assembled onto the rim R. In this embodiment, the boundary in the tire radial direction between the first rubber chafer 9a and the second rubber chafer 9b is located in the vicinity of the outer side in the tire radial direction of the bead core 5.

The second rubber chafer 9b is formed of a rubber material with a loss coefficient tan δ and a breaking strength higher than those of the first rubber chafer 9a. This improves the durability of the rim back face portion, such as rim shifting friction and cracking durability, without deteriorating the air sealing property, weather resistance, fatigue resistance, and rim slip resistance of the tire 1.

Each breaking strength of the first rubber chafer 9a, the second rubber chafer 9b, and the side rubber 10 is measured, for example, according to JIS K6301. Each loss coefficient tan δ of the first rubber chafer 9a, the second rubber chafer 9b, and the side rubber 10 is measured using a spectrometer, for example, under conditions at room temperature, at 52 Hz, and with an amplitude distortion of 2%.

In this embodiment, it is preferable that, in the radial tire for aircraft 1, in the tire widthwise cross-sectional view, in the reference state, at the stress concentration position P of the carcass 6, a thickness GW of the first rubber chafer 9a and a thickness SW of the stiffener rubber 8 (i.e., in this embodiment, a thickness obtained by adding the thickness of the second stiffener rubber 8b to the thickness of the sheet rubber 8c) located on the outer side in the tire width direction of the carcass 6, which are in a direction perpendicular to the outer edge in the tire width direction of the carcass 6, satisfy $0.2 \leq GW/SW \leq 0.35$. Decreasing GW/SW causes the heat from the first rubber chafer 9a located on the outer surface side of the tire 1 with respect to the second stiffener rubber 8b to be less likely to be transferred to the vicinity of the stress concentration position P of the carcass 6. On the other hand, increasing GW/SW improves the durability and wear resistance of the bead portion 2. In particular, setting GW/SW to $0.2 \leq GW/SW \leq 0.35$ can cause the heat from the first rubber chafer 9a located on the outer surface side of the tire 1 with respect to the second stiffener rubber 8b to be less likely to be transferred to the vicinity of the stress concentration position P of the carcass 6, while ensuring the durability of the bead portion 2, thus causing the carcass 6 to be less likely to be broken.

The belt 7 is disposed on the outer side in the tire radial direction in the crown region of the carcass 6. In this embodiment, the belt 7 is provided to cover the carcass 6 at the tread portion 4. However, the belt 7 may be provided over the tread portion 4 and a part of the sidewall portions 3.

The belt 7 is composed of one or more (in this embodiment, four) belt layers laminated in the tire radial direction on the tire equatorial plane CL. The belt 7 has one or more (in this embodiment, three) main belt layers (spiral belt layers) 71 and one or more (in this embodiment, one) sub belt layers (zigzag belt layers) 72 disposed on the outer side in the tire radial direction of the main belt layers 71.

Figure 3:
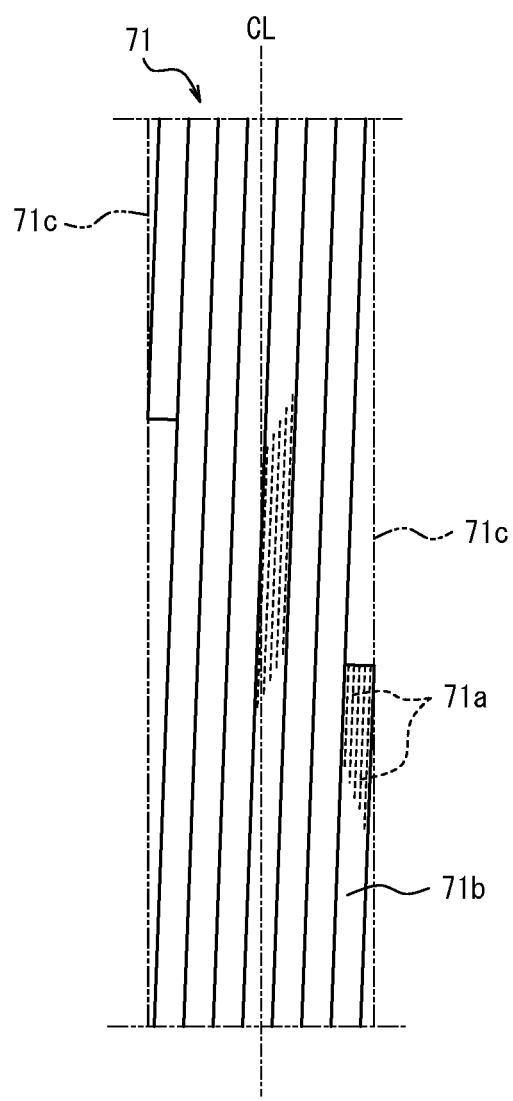
FIG. 3 is a schematic view of a main belt layer of the radial tire for aircraft illustrated in FIG. 1 viewed from an outer side in a tire radial direction.

First, the main belt layer 71 is described with reference to FIG. 3. FIG. 3 is a schematic view of the main belt layer 71 in the radial tire for aircraft 1 viewed from the outer side in the tire radial direction. As illustrated in FIG. 3, the main belt layer 71, which is a spiral belt layer, is configured such that the strip member 71b on which the belt cord 71a is rubber-coated is spirally wound in the tire circumferential direction. The belt cord 71a is, for example, an organic fiber cord such as Kevlar.

The main belt layer 71 is formed on the crown portion of the carcass 6 in a raw tire, such that the strip member 71b is spirally wound in the tire circumferential direction while being shifted by a predetermined amount in the tire width direction so as not to make a gap with the adjacent strip member 71b. The inclination angle with respect to the tire circumferential direction of the belt cord 71a is, for example, 5 degrees or less. That is, the main belt layer 71 is a belt layer including a belt cord inclined in a range of 0 degrees to 5 degrees with respect to the tire equatorial plane CL. Thus, winding the belt cord having high strength, such as Kevlar, with a small inclination with respect to the tire equatorial plane CL can achieve the wear resistance required for the tread portion 4 with the belt layer 71 having a fewer number of layers, thus ensuring weight saving of the tire 1.

When the main belt layer 71 is composed of a plurality of layers, the strip member 71b is layered by being wound up to one tire widthwise edge 71c of the main belt layer 71 and then folded back, subsequently wound as a next layer on the outer side in the tire radial direction to be wound toward the other tire widthwise edge 71c.

Figure 4:
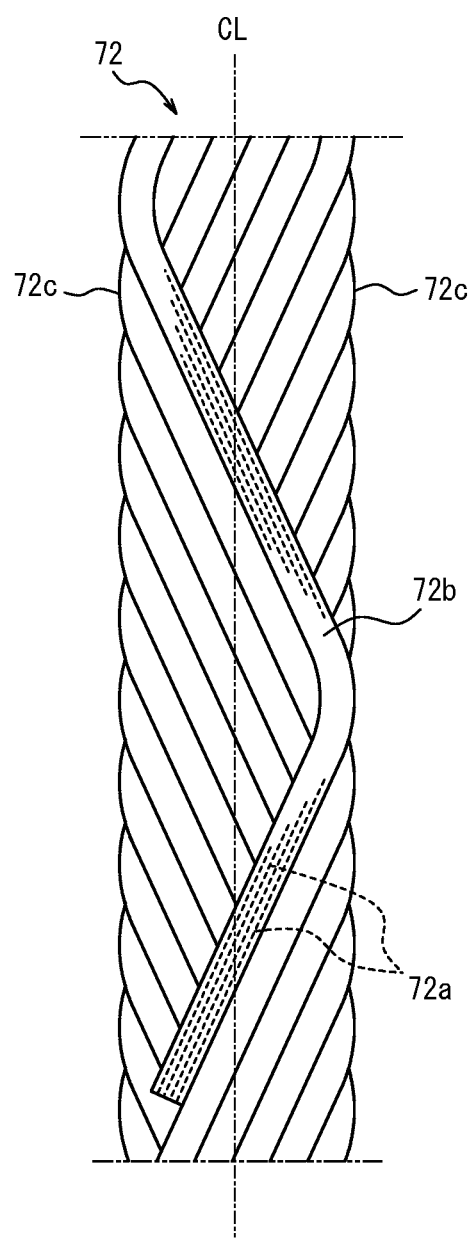
FIG. 4 is a schematic view of a sub belt layer of the radial tire for aircraft illustrated in FIG. 1 viewed from the outer side in the tire radial direction.

Next, the sub belt layer 72 is described with reference to FIG. 4. FIG. 4 is a schematic view of the sub belt layer 72 in the radial tire for aircraft 1 viewed from the outer side in the tire radial direction. As illustrated in FIG. 4, the sub belt layer 72, which is a zigzag belt layer, is configured such that the strip member 72b on which the belt cord 72a is rubber-coated is repeatedly folded back at both tire widthwise edges 72c to be wavily wound in the tire circumferential direction. The belt cord 72a is, for example, an organic fiber cord of nylon.

The sub belt layer 72 is formed such that the strip member 72b on which the belt cord 72a is rubber-coated is repeatedly extended from one tire widthwise edge 72c in the tire width direction toward the other tire widthwise edge 72c, folded back at the other tire widthwise edge 72c, and extended from the other tire widthwise edge 72c toward the one tire widthwise edge 72c to be wavily wound in the tire circumferential direction. The inclination angle with respect to the tire circumferential direction of the belt cord 72a is, for example, 5 degrees to 23 degrees. That is, the sub belt layer 72 is a belt layer including a belt cord inclined in a range of 5 degrees to 23 degrees with respect to the tire equatorial plane CL.

With reference to FIG. 1 again, in this embodiment, the length between both ends in the tire width direction of the main belt layer 71 is longer than the length between both ends in the tire width direction of the sub belt layer 72. More specifically, the main belt layer 71 located at the most inner side in the tire radial direction of the one or more main belt layers 71 is the widest belt layer having the maximum width in the tire width direction. In the present description, the distance between both ends of the widest belt layer is referred to as a belt width BW. However, the widths of the belt layers included in the belt 7 are not limited to the above example, and any belt layer may have the maximum width in the tire width direction. In this embodiment, the outer ends in the tire width direction of the widest belt layer are located at the outer sides in the tire width direction with respect to the ground contact edges E. However, the outer ends in the tire width direction of the widest belt layer may be located at the inner sides in the tire width direction with respect to the ground contact edges E.

The tire 1 may further include one or more (in this embodiment, one) belt reinforcement layers 73 that reinforce the belt 7. The belt reinforcement layer 73 is disposed on the outer side in the tire radial direction of the belt 7. The belt reinforcement layer 73 is formed such that a highly elastic organic fiber cord such as Kevlar is wavily wound in the tire circumferential direction. The tire 1 including the belt reinforcement layer 73 can protect the belt 7 from damage or reduce the damage of the belt 7 when a protruding object or the like intrudes inside the tire 1 from a tread surface. Such a belt reinforcement layer 73 is particularly effective in a tire for aircraft, which has large load and extremely high prescribed internal pressure. In this embodiment, the outer ends in the tire width direction of the belt reinforcement layer 73 are located at the inner sides in the tire width direction with respect to the ground contact edges E. However, the outer ends in the tire width direction of the belt reinforcement layer 73 may be located at the outer sides in the tire width direction with respect to the ground contact edges E.

In the radial tire for aircraft 1 according to this embodiment, in the tire widthwise cross-sectional view in the reference state, a tread width TW and the tire maximum width W satisfy $0.73 < TW/W < 0.8$.

In the present description, the "tread width" refers to a distance between the ground contact edges E of the tire 1 in the tire widthwise cross-sectional view in the reference state. The ground contact edges E of the tire 1 are specified in a state where the tire 1 is assembled onto the rim R of the wheel, the applicable rim, charged with the prescribed internal pressure, and loaded with the prescribed load, as described above. The specified distance between the ground contact edges E of the tire 1 is measured in the reference state to derive the tread width TW.

In the radial tire for aircraft 1, the load is large, and the prescribed internal pressure is extremely high. Thus, the damage of the bead portion 2 due to the collapsing of the bead portion 2 is likely to occur compared with a normal passenger vehicle tire. Therefore, in the radial tire for aircraft 1, setting the ratio TW/W of the tread width TW to the tire maximum width W into an appropriate range can reduce the collapsing of the bead portion 2 in the tire 1 and thus reduce the strain of the part in contact with the rim R of the bead portion 2. Decreasing TW/W can cause the bead portion 2 to be less likely to collapse to improve the durability of the bead portion 2. On the other hand, increasing TW/W can increase the contact patch with the road surface to improve the wear resistance of the tread portion 4. In particular, setting the ratio of the tread width TW to the tire maximum width W to $0.73 < TW/W < 0.8$ can improve the durability of the bead portion 2 while ensuring the wear resistance of the tread portion 4, thus improving the durability of the tire 1.

EXAMPLES

The following describes examples of this disclosure with reference to Table 1. However, this disclosure is not limited to the following examples. Table 1 presents simulation results for examples of the radial tire for aircraft 1 according to this disclosure.

Examples 1 to 4 and Comparative Example 2, the durability of the bead portion was improved compared with that in Comparative Example 1.

TABLE 1

| | Simulation conditions | | | | | | | | | Durability of bead portion | | Wear resistance | |
|---|---|---|---|---|---|---|---|---|---|---|---|---|---|
| | During internal pressure unloaded | | Tread width TW [mm] (width between ground contact edges) | Tire maximum width W [mm] (width between both ends) | TW/W | Rim width RW [mm] (width between both ends) | RW/W | Maximum belt width BW [mm] (width between both ends) | RW/BW | | | | |
| | Tread width TW [%] | Maximum width W [%] | | | | | | | | Predictive life [%] | Determination | Index [%] | Determination |
| Comparative Example 1 | 100 | 100 | 327.8 | 409.0 | 0.8016 | 266.7 | 0.6520 | 323.0 | 0.8256 | 100 | — | 100 | — |
| Example 1 | 96 | 100 | 315.7 | 406.8 | 0.7761 | 266.7 | 0.6555 | 323.0 | 0.8256 | 108 | OK | 96 | OK |
| Example 2 | 92 | 100 | 303.5 | 404.7 | 0.7499 | 266.7 | 0.6589 | 323.0 | 0.8256 | 119 | OK | 92 | OK |
| Comparative Example 2 | 88 | 100 | 291.2 | 402.5 | 0.7234 | 266.7 | 0.6624 | 323.0 | 0.8256 | 128 | OK | 88 | NG |
| Example 3 | 92 | 98 | 302.1 | 398.1 | 0.7589 | 266.7 | 0.6698 | 301.8 | 0.8836 | 118 | OK | 92 | OK |
| Example 4 | 92 | 96 | 301.6 | 393.7 | 0.7660 | 266.7 | 0.6772 | 301.8 | 0.8836 | 117 | OK | 92 | OK |

Simulation was performed on tires in Examples 1 to 4 and Comparative Examples 1 and 2 presented in Table 1, and the durability of the bead portion and the wear resistance of the tire were evaluated.

Specifically, the tires in Examples 1 to 4 and Comparative Examples 1 and 2 presented in Table 1 are tires having the configuration of the radial tire for aircraft 1, which has been described using FIG. 1. Examples 1 to 4 and Comparative Examples 1 and 2 each have different tread width TW and tire maximum width W in a shape during the internal pressure unloaded. In Table 1, the tread width TW and the tire maximum width W in the shape during the internal pressure unloaded in each of Examples 1 to 4 and Comparative Examples 1 and 2 are expressed in percentage when the tread width TW and the tire maximum width W in Comparative Example 1 are 100%. Here, the shape during the internal pressure unloaded is a shape of the tire in an unloaded (load-unapplied) state where the tire is mounted on the applicable rim and charged with a low internal pressure of 30 kPa. Based on the values in the shape during the internal pressure unloaded in Examples 1 to 4 and Comparative Examples 1 and 2, respective values presented in Table 1 as the tread width TW, the tire maximum width W, the rim width RW, and the maximum belt width BW are set to implement the simulation. The tires in Examples 1 to 4 and Comparative Examples 1 and 2 have an identical configuration one another for the configurations other than the specifications presented in Table 1.

The present simulation uses Finite Element Method (FEM). Specifically, the durability of the bead portion and the wear resistance of the tire were evaluated for Examples 1 to 4 and Comparative Examples 1 and 2 by analyzing the stress and strain of the tire using FEM.

The durability of the bead portion was evaluated based on a predictive life. Here, the predictive life is an endurance test life calculated based on the stress and strain of the tire, which are predicted using FEM. In Table 1, the predictive life in each of Examples 1 to 4 and Comparative Examples 1 and 2 is expressed in percentage when the predictive life in Comparative Example 1 is 100%. A larger numerical value of the predictive life indicates a higher durability of the bead portion. As a result of the evaluation, in all of The wear resistance of the tire was evaluated based on Index. Here, Index is a wear resistance index calculated based on the shear force on the tire tread surface, which has been analyzed using FEM. In Table 1, Index in each of Examples 1 to 4 and Comparative Examples 1 and 2 is expressed in percentage when Index in Comparative Example 1 is 100%. A larger numerical value of Index indicates a higher wear resistance of the tire. As a result of the evaluation, in Examples 1 to 4, the decrease in wear resistance was kept within an allowable range compared with that in Comparative Example 1 (in the present examples, the decrease from the numerical value in Comparative Example 1 is within a range of less than 12%), while in Comparative Example 2, the decrease in wear resistance was beyond the allowable range.

From the above, it is clear that in the radial tire for aircraft 1, when the tread width TW and the tire maximum width W satisfy $0.73<TW/W<0.8$ in the tire widthwise cross-sectional view in the reference state, the durability of the bead portion is improved, while ensuring the wear resistance of the tire.

As described above, in the radial tire for aircraft 1 according to one of the embodiments, the rim width RW of the applicable rim R and the tire maximum width W satisfy $RW/W≤0.7$ in the tire widthwise cross-sectional view in the reference state where the radial tire for aircraft 1 is assembled onto the applicable rim R, charged with the prescribed internal pressure, and unloaded, and the tread width TW and the tire maximum width W satisfy $0.73<TW/W<0.8$ in the tire widthwise cross-sectional view in the reference state. With the above configuration, in the radial tire for aircraft 1 having large load and extremely high prescribed internal pressure, the durability of the bead portion 2 can be improved while ensuring the wear resistance of the tread portion 4, thus improving the durability of the radial tire for aircraft 1.

It is preferable that the radial tire for aircraft 1 according to one of the embodiments includes the pair of bead cores 5, the carcass 6 toroidally extending between the pair of bead cores 5, stiffener rubbers (second stiffener rubber 8b and sheet rubber 8c) located on the outer side in the tire width direction of the carcass 6, and the first rubber chafer 9a located on the outer side in the tire width direction of these stiffener rubbers (second stiffener rubber 8*b* and sheet rubber 8*c*), and when a position where a virtual line extending from the outer end R2*a*E in the tire width direction of the curved portion R2*a* of the rim flange R2 of the applicable rim R to the outer side in the tire radial direction intersects with the outer edge in the tire width direction of the carcass 6 is the stress concentration position P of the carcass 6, in the tire widthwise cross-sectional view in a state where the radial tire for aircraft 1 is assembled onto the applicable rim R, charged with the prescribed internal pressure, and loaded with the prescribed load, the thickness GW of the first rubber chafer 9*a* and the thickness SW of the stiffener rubbers (second stiffener rubber 8*b* and sheet rubber 8*c*), which are in a direction perpendicular to the outer edge in the tire width direction of the carcass 6, satisfy 0.2≤GW/SW≤0.35, at the stress concentration position P of the carcass 6, in the tire widthwise cross-sectional view, in the reference state. With the above configuration, the radial tire for aircraft 1 can cause the heat from the first rubber chafer 9*a* located on the outer surface side of the tire 1 with respect to the stiffener rubbers (second stiffener rubber 8*b* and sheet rubber 8*c*) to be less likely to be transferred to the vicinity of the stress concentration position P of the carcass 6, while ensuring the durability of the bead portion 2. Thus, in the radial tire for aircraft 1, the carcass 6 is less likely to be damaged.

It is preferable that in the radial tire for aircraft 1 according to one of the embodiments, the stiffener rubbers (second stiffener rubber 8*b* and sheet rubber 8*c*) located on the outer side in the tire width direction of the carcass 6 includes the sheet rubber 8*c* that covers the surface on the inner side in the tire width direction. With the above configuration, the sheet rubber 8*c* can reduce a difference in the level of rigidity between the second stiffener rubber 8*b* and the carcass 6 to mitigate the strain of the second stiffener rubber 8*b* in a state where the radial tire for aircraft 1 is assembled onto the rim R. Therefore, the durability of the radial tire for aircraft 1 can be further improved.

It is preferable that the radial tire for aircraft 1 according to one of the embodiments includes the second rubber chafer 9*b* located on the inner side in the tire radial direction of the first rubber chafer 9*a*, and the second rubber chafer 9*b* has a loss coefficient tan δ and a breaking strength higher than those of the first rubber chafer 9*a*. With the above configuration, the durability of the rim back face portion, such as rim shifting friction and cracking durability, is improved without deteriorating the air sealing property, weather resistance, fatigue resistance, and rim slip resistance of the radial tire for aircraft 1.

It is preferable that in the radial tire for aircraft 1 according to one of the embodiments, the loss coefficient tan δ of the stiffener rubber (second stiffener rubber 8*b*) located on the outer side in the tire width direction of the carcass 6 is smaller than the loss coefficient tan δ of the first rubber chafer 9*a*. With the above configuration, disposing the stiffener rubber (second stiffener rubber 8*b*) having the lower loss coefficient tan δ in the vicinity of the carcass 6 can decrease the temperature in the vicinity of the carcass 6. Thus, the durability of the radial tire for aircraft 1 can be further improved.

Although this disclosure has been described based on the drawings and embodiments, note that a person skilled in the art could make various deformations and modifications based on this disclosure. Therefore, note that these deformations and modifications are included in the scope of this disclosure. For example, the configurations, function, or the like included in the respective embodiments or examples can be rearranged so that they are logically consistent. The configurations, function, or the like included in the respective embodiments can be used in combination with the other embodiments or examples, and a plurality of configurations, function, or the like can be combined, divided, or partially omitted.

REFERENCE SIGNS LIST

100 tire (radial tire for aircraft)
2 bead portion
3 sidewall portion
4 tread portion
5 bead core
5*c* center of the bead core
6 carcass
6*a* turn-up ply
6*a*B ply main body
6*a*T ply windup portion
6*b* down ply
7 belt
71 main belt layer
71*a* belt cord
71*b* strip member
71*c* tire widthwise edge
72 sub belt layer
72*a* belt cord
72*b* strip member
72*c* tire widthwise edge
73 belt reinforcement layer
8 stiffener rubber
8*a* first stiffener rubber
8*b* second stiffener rubber (stiffener rubber located on the outer side in the tire width direction of the carcass)
8*c* sheet rubber (stiffener rubber located on the outer side in the tire width direction of the carcass)
9 rubber chafer
9*a* first rubber chafer
9*b* second rubber chafer
10 side rubber
11 tread rubber
R rim (applicable rim)
R1 bead sheet
R2 rim flange
R2*a* curved portion
R2*a*E outer end in the tire width direction
R2*b* horizontal portion
CL tire equatorial plane
E ground contact edge
P stress concentration position
W tire maximum width
RW rim width
TW tread width
BW belt width
GW thickness of the first rubber chafer
SW thickness of the stiffener rubber located on the outer side in the tire width direction of the carcass

The invention claimed is:

1. A radial tire for aircraft, comprising:
   a pair of bead cores;
   a carcass toroidally extending between the pair of bead cores;
   a stiffener rubber located on an outer side in a tire width direction of the carcass;
   a first rubber chafer located on the outer side in the tire width direction of the stiffener rubber; and
   a second rubber chafer located on an inner side in a tire radial direction of the first rubber chafer, wherein in a tire widthwise cross-sectional view, in a reference state assembled onto an applicable rim, charged with a prescribed internal pressure, and unloaded, a rim width RW of the applicable rim and a tire maximum width W satisfy RW/W≤0.7, in the tire widthwise cross-sectional view, in the reference state, a tread width TW and the tire maximum width W satisfy 0.73<TW/W<0.8, the applicable rim comprises a rim flange having a curved portion that is convex to an outer side in the tire radial direction, in the tire widthwise cross-sectional view, in the reference state, a boundary in the tire radial direction between the first rubber chafer and the second rubber chafer is in contact with the stiffener rubber at a first end in the tire width direction and with a portion of the rim flange that is located on the inner side in the tire radial direction of the curved portion at a second end in the tire width direction, in the tire widthwise cross-sectional view, in the reference state, an inner edge in the tire radial direction of the stiffener rubber is located on the inner side in the tire radial direction of the boundary in the tire radial direction between the first rubber chafer and the second rubber chafer, and on the outer side in the tire radial direction of a center of either one of the pair of bead cores, and in the tire widthwise cross-sectional view, in the reference state, the inner edge in the tire radial direction of the stiffener rubber is located on the inner side in the tire radial direction of an inner edge in the tire radial direction of the first rubber chafer, the inner edge in the tire radial direction of the first rubber chafer being on the boundary.

2. The radial tire for aircraft according to claim 1, wherein in the tire widthwise cross-sectional view, in a state where the radial tire for aircraft is assembled onto the applicable rim, charged with the prescribed internal pressure, and loaded with a prescribed load, when a position at which a virtual line extending outward in the tire radial direction from an outer end in the tire width direction of the curved portion in the rim flange of the applicable rim intersects with an outer edge in the tire width direction of the carcass is a stress concentration position of the carcass, and in the tire widthwise cross-sectional view, in the reference state, at the stress concentration position of the carcass, a thickness GW of the first rubber chafer and a thickness SW of the stiffener rubber, which are in a direction perpendicular to the outer edge in the tire width direction of the carcass, satisfy 0.2≤GW/SW≤0.35.

3. The radial tire for aircraft according to claim 2, wherein the stiffener rubber includes a sheet rubber covering at least a part of a surface on an inner side in the tire width direction.

4. The radial tire for aircraft according to claim 3, wherein the second rubber chafer has a loss coefficient tan δ and a breaking strength higher than a loss coefficient tan δ and a breaking strength of the first rubber chafer.

5. The radial tire for aircraft according to claim 4, wherein the stiffener rubber has a loss coefficient tan δ smaller than a loss coefficient tan δ of the first rubber chafer.

6. The radial tire for aircraft according to claim 3, wherein the stiffener rubber has a loss coefficient tan δ smaller than a loss coefficient tan δ of the first rubber chafer.

7. The radial tire for aircraft according to claim 2, wherein the second rubber chafer has a loss coefficient tan δ and a breaking strength higher than a loss coefficient tan δ and a breaking strength of the first rubber chafer.

8. The radial tire for aircraft according to claim 7, wherein the stiffener rubber has a loss coefficient tan δ smaller than a loss coefficient tan δ of the first rubber chafer.

9. The radial tire for aircraft according to claim 2, wherein the stiffener rubber has a loss coefficient tan δ smaller than a loss coefficient tan δ of the first rubber chafer.

10. The radial tire for aircraft according to claim 1, wherein in the tire widthwise cross-sectional view, in the reference state, the boundary in the tire radial direction between the first rubber chafer and the second rubber chafer is located between the center and an outer edge, in the tire radial direction, of either one of the pair of bead cores.

11. The radial tire for aircraft according to claim 10, wherein in the tire widthwise cross-sectional view, in the reference state, both the inner edge in the tire radial direction of the first rubber chafer and an outer edge in the tire radial direction of the second rubber chafer are located between the center and the outer edge, in the tire radial direction, of either one of the pair of bead cores, the outer edge in the tire radial direction of the second rubber chafer being on the boundary.

12. The radial tire for aircraft according to claim 1, wherein the rim flange of the applicable rim further has a horizontal portion extending outward in the tire width direction from the curved portion, the radial tire for aircraft is in contact with the curved portion and the horizontal portion in a state where the radial tire for aircraft is assembled onto the applicable rim, charged with the prescribed internal pressure, and loaded with a prescribed load, in the tire widthwise cross-sectional view, in the state where the radial tire for aircraft is assembled onto the applicable rim, charged with the prescribed internal pressure, and loaded with the prescribed load, when a position at which a virtual line extending outward in the tire radial direction from a boundary in the tire width direction between the curved portion and the horizontal portion intersects with an outer edge in the tire width direction of the carcass is a stress concentration position of the carcass, and in the tire widthwise cross-sectional view, in the reference state, at the stress concentration position of the carcass, a thickness GW of the first rubber chafer and a thickness SW of the stiffener rubber, which are in a direction perpendicular to the outer edge in the tire width direction of the carcass, satisfy 0.2≤GW/SW≤0.35.

13. A tire wheel assembly, comprising:
the radial tire for aircraft according to claim 12; and
a wheel comprising the applicable rim configured to have the radial tire assembled thereon.

* * * * *